July 13, 1926.
A. D. GRANT
1,592,101
APPARATUS FOR CLEANSING CLOSET BOWLS
Original Filed July 24, 1923
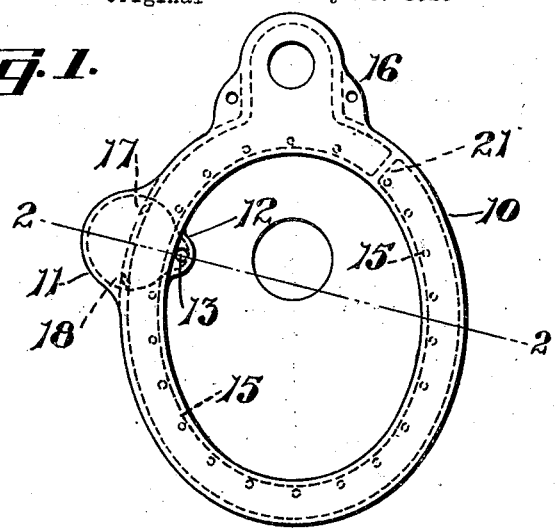
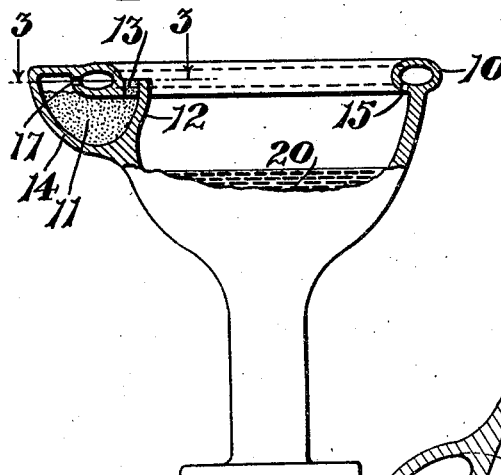
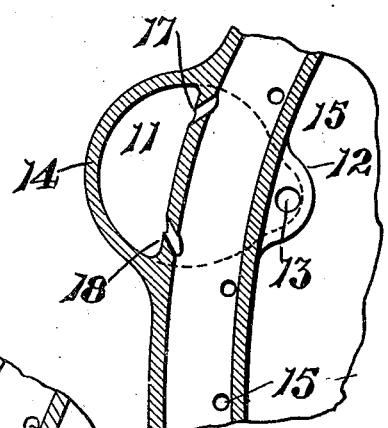
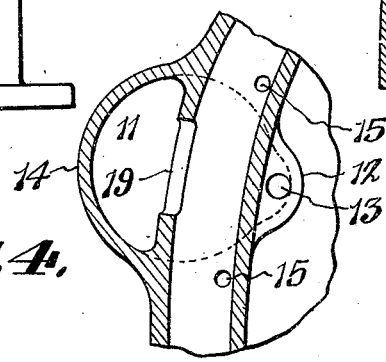
INVENTOR.
ALEXANDER D. GRANT.
BY Dewey, Strong,
Townsend & Loftus
ATTORNEYS.

Patented July 13, 1926.

1,592,101

UNITED STATES PATENT OFFICE.

ALEXANDER D. GRANT, OF SAN JOSE, CALIFORNIA.

APPARATUS FOR CLEANSING CLOSET BOWLS.

Application filed July 24, 1923, Serial No. 653,470. Renewed September 10, 1925.

This invention relates to apparatus for cleansing closet bowls, such as shown and described in my co-pending application, Serial No. 423,294, filed November 11th, 1920. The object of the present invention is to make it possible, with small expense, to incorporate in any style of modern closet bowl or urinal a chamber to contain a cleansing agent, such as a solution from a solid containing an acid or a salt containing an acid. This chamber is made in compact form and does not require additional room or space in the kiln and thereby I am enabled to reduce the cost of manufacture. The invention is applicable to all models of bowls and is placed in the path of the flushing water and operated with slight changes or additions to the original form of the bowl.

One form which my invention may assume is exemplified in the following description and illustrated in the accompanying drawings, in which—

Fig. 1 shows a plan view of a bowl equipped with my invention.

Fig. 2 shows a sectional view of the same taken on the line 2—2 of Fig. 1.

Fig. 3 shows a sectional view taken on the line 3—3 of Fig. 2.

Fig. 4 shows a view similar to Fig. 3, illustrating a modification of the invention.

The invention as herein illustrated comprises a closet bowl of any desired construction having a hollow rim 10 through which the flushing water passes. At one side and near the rear of the bowl is a chamber 11 formed integrally with the bowl and rim. This chamber bulges slightly at the inner side of the bowl, as shown at 12, and terminates below the top of the rim where it is provided with a filling opening 13 which may or may not be fitted with a stopper. Said chamber also bulges at the outside of the bowl, as shown at 14, and extends approximately to the top of the rim. The rim, as is used in bowls of this type, is provided with numerous small openings 15 at its inner side through which the water escapes to the interior of the bowl, water being admitted at the rear of the bowl through a connection 16.

Where the rim passes through the chamber 11 it is formed with an opening 17 to admit the flushing water to the chamber and a second opening 18 to allow the water to return from said chamber to the rim. Instead of the two openings 17 and 18 one slot or opening 19 may be substituted as shown in Fig. 4.

In the operation of the device the chamber 11 is filled with a solid soluble cleansing agent, such as a salt containing an acid, the filling being done through the opening 13. Flushing water enters the rim at the rear of the bowl and circulates through the hollow rim, part of such water entering the chamber 11 through the opening 17. Water enters the chamber in an agitated condition and will mingle with the cleansing agent, thus forcing the solution to be taken up by the passing flushing water. This water, being now in the form of a cleansing solution, returns to the rim through the opening 18, continuing around the rim and escaping at different points into the bowl through the openings 15. Thereby the rim and side walls of the bowl will be cleansed. Some of this cleansing solution will also remain in the water seal 20 when the flushing operation is completed and thereby the bottom of the bowl will be kept clean.

In some cases I prefer to place an obstruction or partition 21 in the rim near the rear of the bowl and on the side thereof opposite the chamber 11 so as to compel the flushing water to pass in the direction of said chamber.

In the apparatus shown in my prior application referred to, the container for the cleansing agent had its filling on the outside of the bowl, and, therefore, the cleansing agent was liable to come in contact with outside surfaces or metal parts of the attachments or connections of the bowl, or even to fall upon the floor, thereby causing injury or damage. The opening as herein shown is on the inside of the bowl. Therefore the filling chamber does not require careful attention, since any particles of the cleansing agent not entering the chamber will merely drop into the inside of the bowl where no damage can result. Furthermore, should the stopper be left out of the filling opening, thus permitting the cleansing solution to overflow during the flushing operation, the overflow will enter the interior of the bowl instead of falling on to the external parts of the bowl.

By using a cleansing agent rather than a disinfectant, the impurities are changed from an insoluble into a soluble condition and therefore they pass through the bowl without becoming precipitated thereon. The bowl is thus kept clean at all times and no necessity exists for any disinfectant.

While the drawings accompanying the present application show merely one form of my invention, it will be understood that the same is capable of various modifications and in the appended claims where reference is made to a bowl, it is to be understood that the term "bowl" is intended also to include any similar device, such as a urinal of the rim flush type.

Having thus described my invention, what I claim and desire to secure by Letters Patent is:

1. The combination with a closet bowl of the rim flush type of a chamber formed integral with the rim and bowl, said chamber having a filling opening on the interior of the bowl whereby a solid soluble cleansing agent may be introduced and communicating means between the interior of the rim and the chamber whereby water passing through the rim will enter the chamber and become charged with the cleansing agent.

2. The combination with a closet bowl of the rim flush type of a chamber formed integral with the rim and bowl and having a portion projecting at the interior of the bowl and formed with a filling opening whereby a solid soluble cleansing agent may be introduced in the chamber and communicating means between the interior of the rim and the chamber whereby water passing through the rim will enter the chamber and become charged with a cleansing agent.

3. The combination with a closet bowl of the rim flush type of a chamber formed integral with the rim and bowl, said chamber having a filling opening disposed at the interior of the bowl whereby a solid soluble cleansing agent may be introduced, said chamber having its outer wall projecting at the outside of the bowl and terminating near the top of the rim and an opening formed in the outside wall of the rim leading to the chamber whereby water passing through the rim will enter said chamber and become charged with the cleansing agent and before passing to the bowl.

4. The combination with a closet bowl of the rim flush type of a chamber formed integral with the rim and bowl, said chamber having a filling opening on the interior of the bowl whereby a solid soluble cleansing agent may be introduced and communicating means between the interior of the rim and the chamber whereby water passing through the rim will enter the chamber and become charged with the cleansing agent and directed through the bowl, and means for obstructing the rim near the rear of the bowl on the side opposite the chamber so as to cause the flushing water to pass in the direction of the said chamber.

ALEXANDER D. GRANT.